United States Patent
Chandran et al.

(10) Patent No.: US 8,104,049 B2
(45) Date of Patent: Jan. 24, 2012

(54) ACCESSING A COMPATIBLE LIBRARY FOR AN EXECUTABLE

(75) Inventors: Shajith Chandran, Karnataka (IN); Harikrlshna Manchineni, Andhra Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 1209 days.

(21) Appl. No.: 11/832,756

(22) Filed: Aug. 2, 2007

(65) Prior Publication Data

US 2009/0037933 A1 Feb. 5, 2009

(51) Int. Cl.
*G06F 9/44* (2006.01)
*G06F 9/46* (2006.01)
*G06F 11/00* (2006.01)

(52) U.S. Cl. ........ 719/331; 719/312; 719/332; 717/162; 717/163; 717/164; 714/1; 714/38.1; 714/100

(58) Field of Classification Search .................... 719/331
See application file for complete search history.

(56) References Cited

U.S. PATENT DOCUMENTS

| | | | |
|---|---|---|---|
| 5,375,241 A * | 12/1994 | Walsh | 719/331 |
| 6,865,742 B1 | 3/2005 | Khare et al. | |
| 6,871,344 B2 * | 3/2005 | Grier et al. | 717/162 |
| 7,073,170 B2 * | 7/2006 | Grier et al. | 717/162 |
| 7,216,332 B2 * | 5/2007 | Smith | 717/106 |
| 7,523,472 B2 * | 4/2009 | D'Souza et al. | 719/331 |
| 7,634,768 B2 * | 12/2009 | Chen et al. | 717/162 |
| 7,694,277 B2 * | 4/2010 | Yuknewicz et al. | 717/121 |
| 2004/0103406 A1 * | 5/2004 | Patel | 717/140 |

* cited by examiner

*Primary Examiner* — Qing Wu
(74) *Attorney, Agent, or Firm* — Yee & Associates, P.C.; David A. Mims, Jr.

(57) ABSTRACT

The illustrative embodiments described herein provide a computer-implemented method, apparatus, and computer-usable program code for accessing a compatible library. The process receives a file name associated with a library reference. The library reference is included in an executable, and indicates a library used for executing the executable. The process receives environmental variable information in response to identifying an unavailable library in a secondary memory. The unavailable library is associated with the file name. The process accesses the compatible library from a shared library segment using the file name in response to receiving the environmental variable information. The compatible library is associated with the file name. The process utilizes the compatible library to execute the executable.

20 Claims, 4 Drawing Sheets

ACCESSING A COMPATIBLE LIBRARY FOR AN EXECUTABLE

BACKGROUND OF THE INVENTION

1. Field of the Invention

The present invention relates generally to a data processing system and in particular to a method and apparatus for accessing a library. More particularly, the present invention is directed to a computer-implemented method, apparatus, and computer-usable program code for accessing a compatible library to execute an executable that references a library.

2. Description of the Related Art

Executables in a data processing system often reference one or more libraries while loading or executing. A library is a collection of functions, subprograms, methods, procedures, subroutines, data, or any combination thereof. Because a single library may be referenced by different applications, the functions contained in a library may be easily reused. Examples of libraries include the C standard library, the standard input/output library, and libraries containing math functions, string handling functions, and time manipulation functions. Examples of operating systems that support the use of libraries include Advanced Interactive executive (AIX), Unix, and Microsoft® Windows®. AIX is available from International Business Machines Corporation. Microsoft and Windows are trademarks of Microsoft Corporation in the United States, other countries, or both.

Unlike a static library, from which functions are copied into an application at the time of compilation, a dynamic, or shared, library contains functions that remain in a separate file on a storage medium. Executables may contain one or more library references to a dynamic library. For example, a library reference may be designated by an absolute path, such as "/usr/lib/libc.a", or a relative path, such as "libc.a". At the time the executable is either loaded or executed, a loader, which is part of the underlying operating system, links the referenced library to the executable. The executable may then utilize the library contained in the library reference.

A primary advantage of using a dynamic library is that the library functions are not copied directly into an application. Therefore, an updated or improved version of the functions in the dynamic library may be referenced by the executable using the same library reference. Unless indicated otherwise, the term "library," as used below, is intended to indicate a dynamic, or shared, library.

Before an executable can access a library, the library must be loaded onto the shared library segment, which may be located on a computer's primary memory. The loader loads a referenced library onto the shared library segment from a secondary memory. Secondary memory is used to store data that is not currently in active use. An example of secondary memory is a hard drive. A different version of a library may be loaded onto the shared library segment alongside the already loaded original version. However, if the referenced library that is being loaded onto the shared library segment from the secondary memory is unavailable, the executable containing the corresponding library reference will fail to execute.

A library can be unavailable for any of a variety of reasons. For example, a library may be unavailable if the library is incompatible. A library may be incompatible for an executable if the library fails to resolve the symbols, functions, or variables used by the executable. A library may also be incompatible if the particular version of the library is incompatible with the kernel of the operating system. A library may be incompatible if dependent libraries fail to export functions or data that are referenced by the library on which the dependent library depends. A corrupt library also can prevent an executable from executing. A library may be unavailable if the library is absent from the secondary memory. For example, the referenced library may have been accidentally deleted from the secondary memory by a user.

In addition to command execution failure, complete system failure may also result from the presence of an incompatible library on the secondary memory. Further, if the incompatible library is itself needed to recover from the system failure, then the user may have no choice except to reboot or even reinstall the system. For example, the commands that reference the C standard library, many of which are critical to the operation of a computer system, will fail to execute if the C standard library is incompatible, possibly resulting in system failure. In addition, the commands needed to recover from the system failure will be unable to execute because the recovery commands also require the C standard library. Therefore, reinstallation of the system may be necessary to restore the C standard library and other critical libraries onto the system.

Current systems attempt to recover from a failed executable by providing a statically-linked executable that substitutes the failed dynamically-linked executable. However, this approach provides redundant executables because both a statically-linked executable and a dynamically-linked executable must be provided. In addition, the effectiveness of the current solution is limited to the number of statically-linked commands provided by a particular vendor for a special case.

Another approach used by current systems stores duplicate copies of critical libraries, such as the C standard library, in paths that are hidden to a user. Library references are redirected to the duplicate copies by providing a command that sets an environment variable. However, this approach fails if the duplicate copies of the libraries are themselves lost or corrupted.

SUMMARY OF THE INVENTION

The illustrative embodiments described herein provide a computer-implemented method, apparatus, and computer-usable program code for accessing a compatible library. The process receives a file name associated with a library reference. The library reference is included in an executable, and indicates a library used for executing the executable. The process receives environmental variable information in response to identifying an unavailable library in a secondary memory. The unavailable library is associated with the file name. The process accesses the compatible library from a shared library segment using the file name in response to receiving the environmental variable information. The compatible library is associated with the file name. The process utilizes the compatible library to execute the executable.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
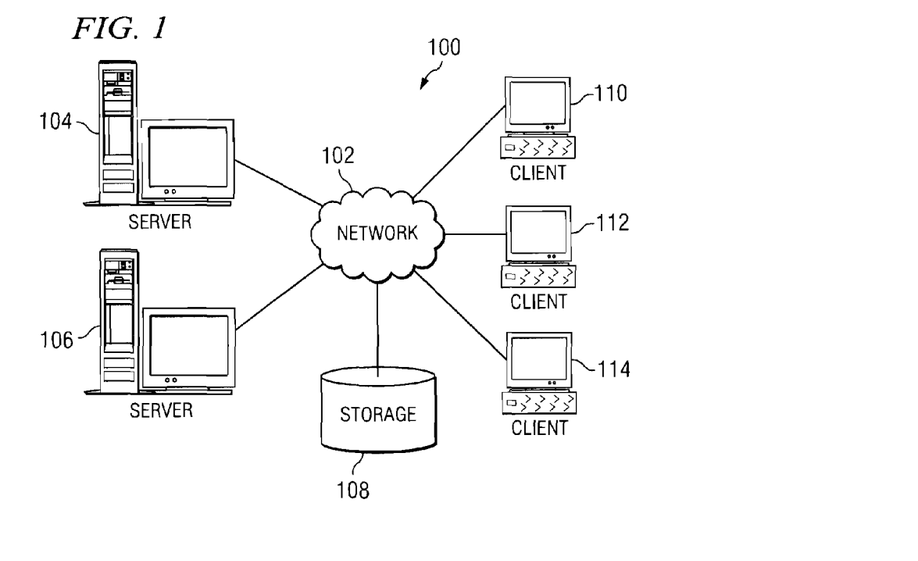
FIG. 1 depicts a pictorial representation of a network data processing system in which an illustrative embodiment may be implemented.
Figure 2:
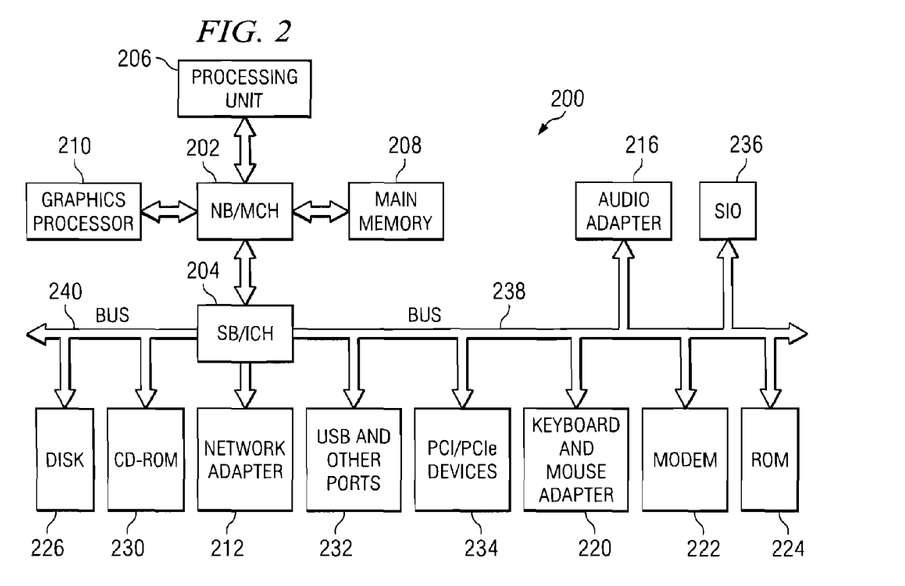
FIG. 2 depicts a block diagram of a data processing system in which an illustrative embodiment may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer-implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUS. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments described herein provide a computer-implemented method, computer program product, and apparatus for accessing a compatible library. The process receives a file name associated with a library reference. The library reference is included in an executable and indicates a library used for executing the executable. The process receives environmental variable information in response to identifying an unavailable library in a secondary memory. The unavailable library is associated with the file name.

In an alternative embodiment, the unavailable library is an incompatible library that cannot be utilized to execute the executable. In another illustrative embodiment, the unavailable library indicates an inability to identify any library associated with the file name in the secondary memory. The process accesses a compatible library from a shared library segment using the file name in response to receiving the environmental variable information. In the illustrative embodiments, a compatible library is a library that may be utilized to successfully execute an executable that references the library. For example, a compatible library resolves the symbols, functions, or variables used by an executable that references the library. Also, a compatible library is compatible with the kernel of the operating system on which the library is utilized. The compatible library is associated with the file name. The process utilizes the compatible library to execute the executable.

Figure 3:
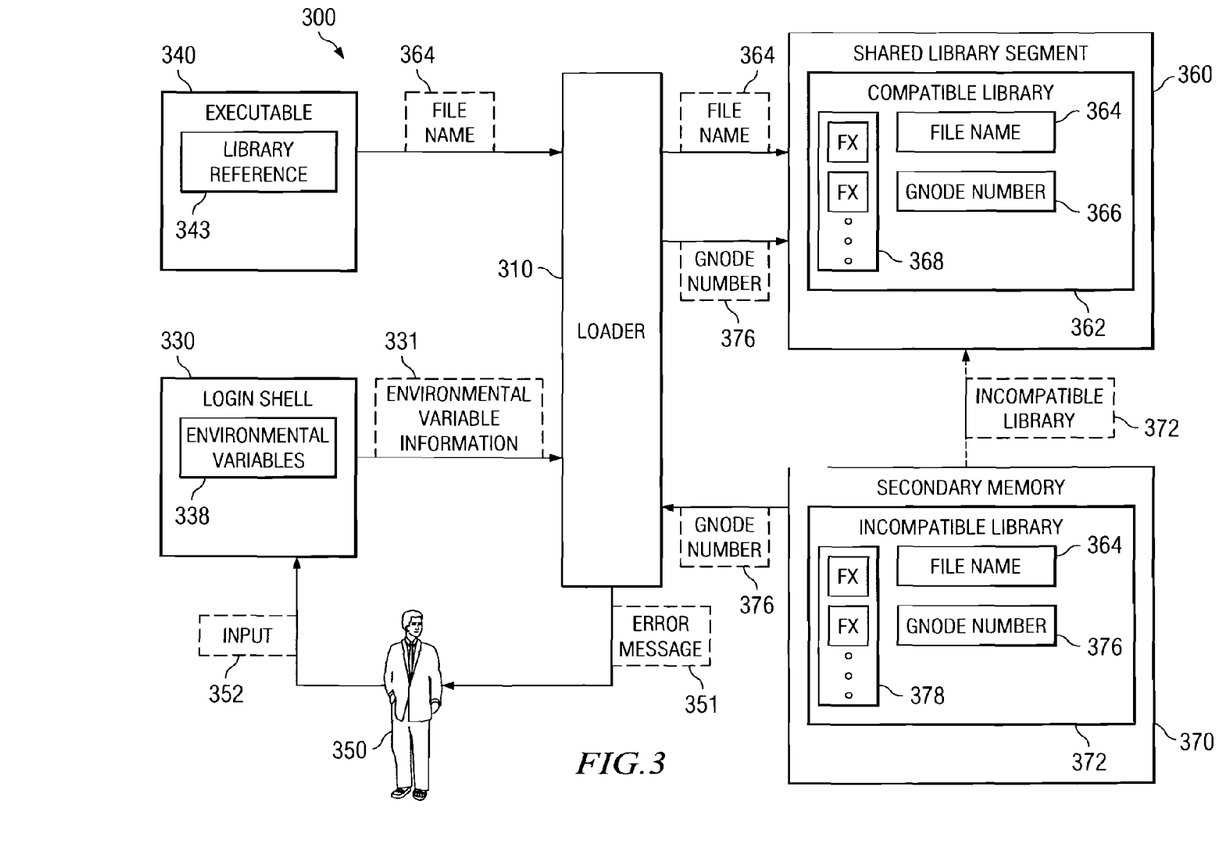
FIG. 3 depicts a diagram of components used to access a compatible library in accordance with an illustrative embodiment.

Turning now to FIG. 3, a diagram of components used to access a compatible library is depicted in accordance with an illustrative embodiment. Data processing system 300 is a data processing system, such as any of data processing systems 104, 106, 110, 112, and 114 in FIG. 1 or data processing system 200 in FIG. 2.

In the illustrative embodiment of FIG. 3, executable 340 contains at least one library reference 343. Executable 340 may be a login shell, a command, an application, a process, a daemon, or any other function of a data processing system that references libraries. Examples of executable 340 include a word processing application, a spreadsheet application, a network connectivity application, Unix commands, IBM®'s DB2, or any other application that utilizes libraries. Although FIG. 3 depicts a single library reference 343 in executable 340, executable 340 may contain any number of library references.

Although executable 340 may itself be a login shell, FIG. 3 also separately depicts login shell 330. Login shell 330 creates a computing environment for data processing system 300 and accepts commands from user 350. The commands in the login shell, including those accepted from user 350, may contain library references, such as library reference 343. Login shell 330 creates a computing environment by defining one or more environment variables 338. Environmental variables are a set of dynamic values that can affect the way running processes will behave on a computer. For example, an environmental variable may list directories to be searched by login shell 330 for each user command.

Library reference 343 indicate a library used for executing executable 340. A library reference may indicate a library using an absolute path, such as "/usr/lib/libc.a", or a relative path, such as "libc.a". In either case, a file name, such as "libc.a," is associated with the library reference.

Library reference 343 references a library that is needed for its execution. A shared library segment is included on a primary memory, and contains one or more libraries that may be referenced by an executable. For example, the shared library segment may be contained in a random access memory, including main memory 208 in FIG. 2. Examples of libraries include the C standard library, the standard input/output library, and libraries containing math functions, string handling functions, and time manipulation functions.

Compatible library 362 has file name 364 and gnode number 366, and includes function set 368. Although FIG. 3 depicts a single library in shared library segment 360, shared library segment 360 can include any number of libraries. Furthermore, library references 343 may reference any of multiple libraries in shared library segment 360. Additionally, although FIG. 3 depicts two functions in function set 368, function set 368 may contain any number of functions, as indicated by the three dots in function set 368.

Executable 340 utilizes function set 368 in compatible library 362. For example, executable 340 may receive one or more results from a function in function set 368. The one or more results from the function in function set 368 facilitate the successful execution of executable 340.

Compatible library 362 must be loaded into shared library segment 360 before compatible library 362 can be successfully utilized by executable 340. Loader 310 loads libraries from secondary memory 370 to shared library segment 360 so that executable 340 may utilize the libraries referenced therein. Loader 310 is part of the operating system of data processing system 300.

Upon initiating execution of executable 340, loader 310 extracts and receives file name 364. For example, loader 310 may extract file name 364 from the binary of executable 340. File name 364 is associated with library reference 343. For example, file name 364 may be included in the absolute path indicated by library reference 343, as in "/usr/lib/libc.a". File name 364 indicates the name of the library that is referenced by library reference 343. An example of file name 364 is "libc.a," which corresponds to the C standard library. Although FIG. 3 depicts a single library reference 343 that is associated with one library, executable 340 may contain multiple library references that are each associated with different libraries. Consequently, loader 310 may receive different file names from multiple library references.

Upon receiving file name 364, loader 310 searches secondary memory 370 to determine whether secondary memory 370 includes a library having file name 364. Examples of secondary memory 370 include a hard drive, such as hard disk drive 226 from FIG. 2, a remote storage device, such as storage 108 from FIG. 1, a flash memory, an optical disk drive, or any other storage device capable of storing libraries.

If a library associated with file name 364 cannot be identified in secondary memory 370, then the library associated with file name 364 is unavailable in secondary memory 370. A library associated with file name 364 may be unavailable in secondary memory 370 for a variety of reasons. For example, the library associated with file name 364 may have been deleted from secondary memory 370 by user 350.

Still with reference to FIG. 3, secondary memory 370 is shown as including incompatible library 372. Incompatible library 372 has file name 364 and gnode number 376, and includes function set 378. A gnode number is a unique identifier that differentiates between different files in a file system. For example, a gnode number may be used to differentiate between different versions of a library. Gnode numbers may be used to ensure that the most recent library is loaded in shared library segment 360 for use by executable 340. Although FIG. 3 depicts differentiating between different versions of a library using a gnode number, any unique identifier that differentiates between different versions of a library may also be used.

Secondary memory 370 includes incompatible library 372 for any of a variety of reasons. For example, user 350 may have installed incompatible library 372 onto secondary memory 370. As another example, incompatible library 372 may have been automatically installed onto secondary memory 370 by a library fix program.

Although FIG. 3 depicts a single library in secondary memory 370, secondary memory 370 can include any number of libraries. Additionally, although FIG. 3 depicts two functions in function set 378, function set 378 may contain any number of functions, as indicated by the three dots in function set 378.

Loader 310 identifies incompatible library 372 because incompatible library 372 has file name 364, which corresponds to file name 364 associated with library reference 343. Upon identifying incompatible library 372, loader 310 extracts and receives the gnode number 376 of incompatible library 372.

Upon receiving gnode number 376 from secondary memory 370, loader 310 searches shared library segment 360 to determine whether shared library segment 360 includes a library having gnode number 376. Upon identifying that neither compatible library 362 nor any other library in shared library segment 360 has gnode number 376, loader 310 initiates loading incompatible library 372 onto shared library segment 360. However, incompatible library 372 will fail to load because of errors during the resolution of incompatible library 372. Because incompatible library 372 fails to load, executable 340 will fail to execute.

Incompatible library 372 may be incompatible for any of a variety of reasons. For example, incompatible library 372 may fail to resolve the symbols, functions, or variables used by executable 340. As another example, incompatible library 372 may be incompatible with the kernel of the operating system of data processing system 300. Incompatible library 372 may also be incompatible if dependent libraries fail to export functions or data referenced by incompatible library 372. A corrupt library also can lead to the failure of the executable.

In addition to the failed execution of executable 340, complete system failure may also result from the presence of incompatible library 372 on the secondary disk. Further, if incompatible library 372 is itself needed to recover from the system failure, then the user will have no choice except to reboot or even reinstall the system. For example, if incompatible library 372 is a C standard library, commands that are critical to the operation of a computer system will fail to execute.

In addition, the commands needed to recover from the system failure will be unable to execute because the recovery commands also require the C standard library. Therefore, reinstallation of the system may be necessary to restore the C standard library and other critical libraries onto the system.

Upon identifying that incompatible library 372 is incompatible or upon identifying that no library associated with file name 364 can be identified in secondary memory 370, loader 310 receives environmental variable information 331 from login shell 330. In this example, environmental variable information is received by loader 310 as a result of defining one or more of environmental variables 338. One or more of environmental variables 338 may be defined as a result of input 352 originating from user 350. User 350 may define one or more of environmental variables 338 for a variety of reasons.

For example, user 350 may define one or more of environmental variables 338 due to an error message 351 indicating that incompatible library 372 is incompatible, that no library associated with file name 364 can be identified in secondary memory 370, or that executable 340 has failed to execute. Also, environmental variables 338 may be automatically defined in response to identifying that incompatible library 372 is incompatible or in response to identifying that no library associated with file name 364 can be identified in secondary memory 370.

Upon receiving environmental variable information 331 from login shell 330, loader 310 determines whether shared library segment 360 includes a library having file name 364. Because shared library segment 360 includes compatible library 362, which has file name 364, loader 310 accesses compatible library 362 so that executable 340 may utilize compatible library 362 to successfully execute. Thus, by accessing compatible library 362 in shared library segment 360, executable 340 may successfully execute despite secondary memory 370 containing incompatible library 372. Likewise, executable 340 may successfully execute despite secondary memory 370 failing to include any library associated with file name 364. Compatible library 362 may also be saved onto secondary memory 370 for future use.

Figure 4:
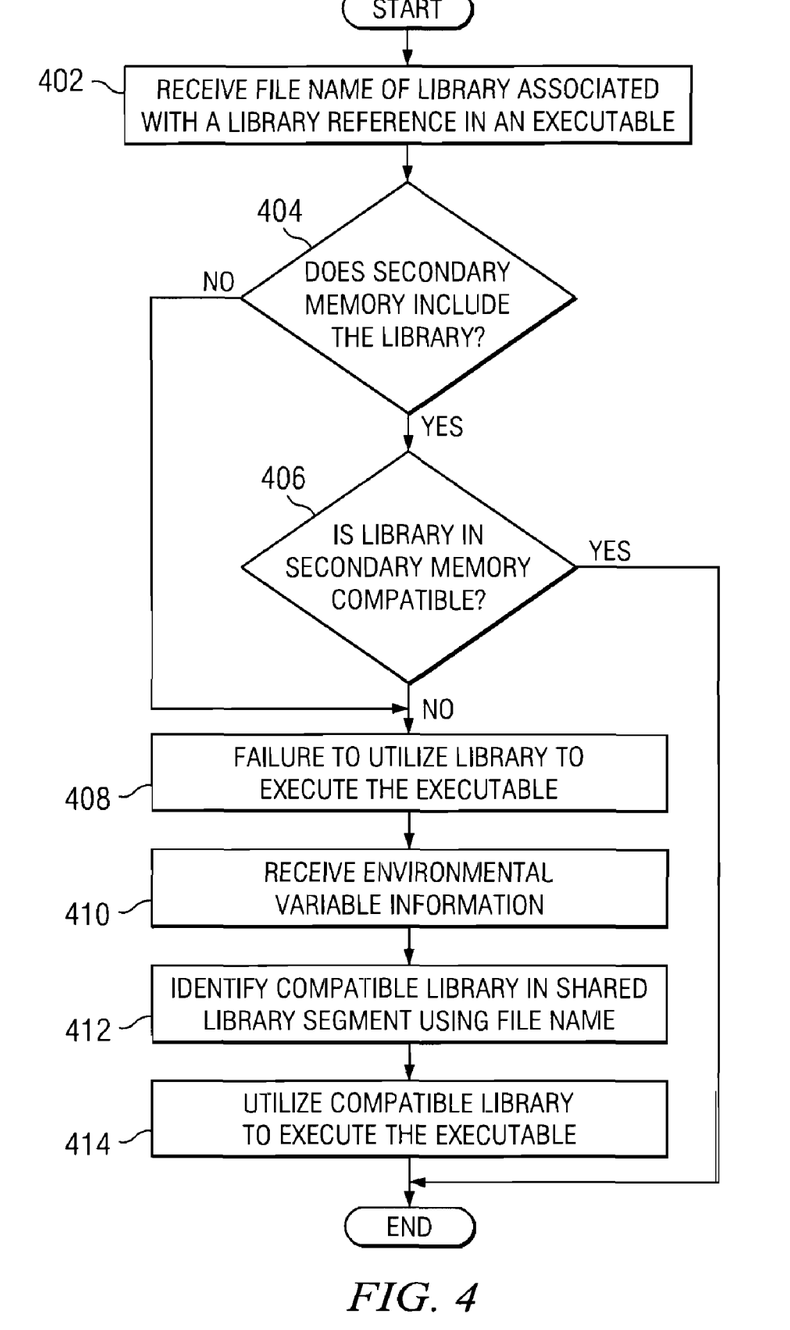
FIG. 4 depicts a flowchart of a process for accessing a compatible library in accordance with an illustrative embodiment.

Turning now to FIG. 4, a flowchart of a process for accessing a compatible library is depicted in accordance with an illustrative embodiment. The process illustrated in FIG. 4 may be implemented by a software component, such as loader 310 of FIG. 3. The process is initiated when an executable that references a library is initiated.

The process begins by receiving the file name of a library associated with a library reference in an executable (step 402). Specifically, the process determines whether the secondary memory includes the library (step 404). If the secondary memory includes the library, then the process determines whether the library included in the secondary memory is compatible (step 406). If the library included in the secondary memory is compatible, then the process terminates. Steps 404 and 406 determine whether the library is unavailable in the secondary memory.

Returning to step 404, if the secondary memory does not include the library, then the process will fail to utilize the library to execute the executable (step 408). Likewise, if the library included in the secondary memory is not compatible, then the process will fail to utilize the library to execute the executable (step 408).

Next, the process receives environmental variable information (step 410). The environmental variable information may originate from a login shell in which an environmental variable has been defined. The environmental variable may be defined by a user. Also, the environmental variable may be defined automatically if either the secondary memory does not include the library or the library included in the secondary memory is not compatible.

Upon receiving environmental variable information, the process identifies a compatible library in the shared library segment using the file name of the library (step 412). The compatible library may be identified by searching the shared library segment using the file name as a search key. The search may be performed by loader 310 of FIG. 3. The process utilizes the compatible library to execute the executable (step 414) and then terminates.

Figure 5:
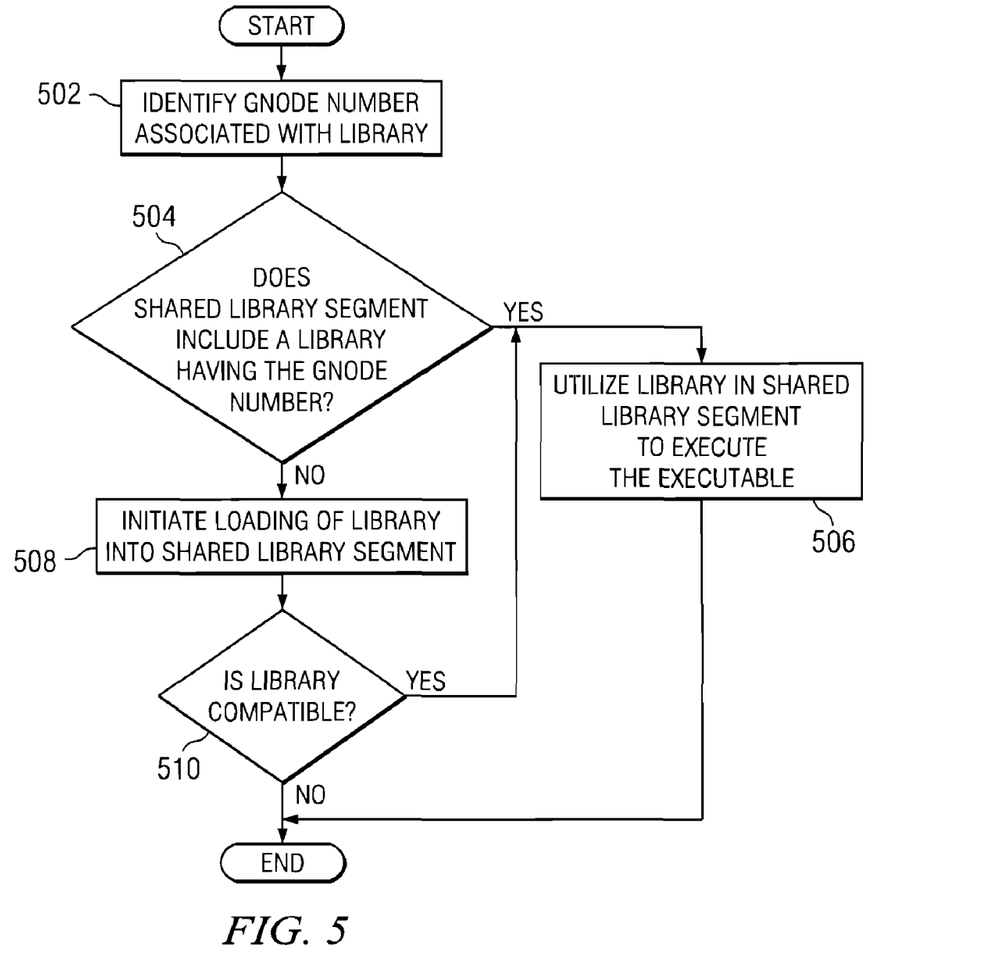
FIG. 5 depicts a flowchart for identifying whether a library is compatible in accordance with an illustrative embodiment.

Turning now to FIG. 5, a flowchart for identifying whether a library is compatible is depicted in accordance with an illustrative embodiment. The process illustrated in FIG. 5 is a more detailed description of step 406 in FIG. 4, and may be implemented by a software component, such as loader 310 of FIG. 3.

The process begins by identifying a gnode number associated with the library included in the secondary memory (step 502). Next, the process determines whether the shared library segment includes a library having the gnode number (step 504). If the shared library segment includes a library having the gnode number, then the process utilizes the library to execute the executable that references the library (step 506) and then terminates.

If the shared library segment does not include a library having the gnode number, then the process initiates loading the library in the secondary memory into the shared library segment (step 508). The process determines whether the library being loaded into the shared library segment is compatible (step 510). If the process determines that the library being loaded into the shared library segment is compatible, then the process utilizes the library to execute the executable that references the library (step 506) and then terminates. If the process determines that the library being loaded into the shared library segment is not compatible, then the process terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer-implemented method, apparatus, and computer-usable program code for accessing a compatible library. The process receives a file name associated with a library reference. The library reference is included in an executable, and indicates a library used for executing the executable. The process receives environmental variable information in response to identifying an unavailable library in a secondary memory. The unavailable library is associated with the file name. In an alternate embodiment, the unavailable library is an incompatible library that cannot be utilized to execute the executable. In another alternate embodiment, the unavailable library indicates an inability to identify any library associated with the file name in the secondary memory. The process accesses the compatible library from a shared library segment using the file name in response to receiving the environmental variable information. The compatible library is associated with the file name. The process utilizes the compatible library to execute the executable.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for accessing a compatible library, comprising:
   receiving a file name associated with a library reference, wherein the library reference is included in an executable and wherein the library reference indicates a particular library used for executing the executable;
   responsive to identifying an unavailable library in a secondary memory, receiving environmental variable information, wherein the unavailable library is associated with the file name;
   responsive to receiving the environmental variable information, accessing the compatible library from a shared library segment using the file name, wherein the compatible library is associated with the file name; and
   utilizing the compatible library to execute the executable.

2. The computer implemented method of claim 1, wherein the unavailable library is an incompatible library.

3. The computer implemented method of claim 2, wherein the incompatible library cannot be utilized to execute the executable.

4. The computer implemented method of claim 1, wherein the unavailable library indicates an inability to identify any library associated with the file name in the secondary memory.

5. The computer implemented method of claim 1, further comprising:
saving the compatible library on the secondary memory.

6. The computer implemented method of claim 1, wherein the shared library segment is located in random access memory.

7. The computer implemented method of claim 1, wherein the secondary memory is a hard drive.

8. The computer implemented method of claim 1, wherein the secondary memory is a remote storage device.

9. The computer implemented method of claim 1, wherein the unavailable library and the compatible library are C standard libraries.

10. A computer program product comprising a computer-readable storage device having stored therein computer-usable program code for accessing a compatible library, the computer-usable program code comprising:
computer-usable program code for receiving a file name associated with a library reference, wherein the library reference is included in an executable, and wherein the library reference indicates a particular library used for executing the executable;
computer-usable program code, responsive to identifying an unavailable library in a secondary memory, for receiving environmental variable information, wherein the unavailable library is associated with the file name;
computer-usable program code, responsive to receiving the environmental variable information, for accessing the compatible library from a shared library segment using the file name, wherein the compatible library is associated with the file name; and
computer-usable program code for utilizing the compatible library to execute the executable.

11. The computer program product of claim 10, wherein the unavailable library is an incompatible library.

12. The computer program product of claim 11, wherein the incompatible library cannot be utilized to execute the executable.

13. The computer program product of claim 10, wherein the unavailable library indicates an inability to identify any library associated with the file name in the secondary memory.

14. The computer program product of claim 10, further comprising:
computer-usable program code for saving the compatible library on the secondary memory.

15. The computer program product of claim 10, wherein the shared library segment is located in random access memory.

16. The computer program product of claim 10, wherein the secondary memory is one of a hard drive or a remote storage device.

17. The computer program product of claim 10, wherein the library, the unavailable library, and the compatible library are C standard libraries.

18. A data processing system comprising:
a bus system;
a memory connected to the bus system, wherein the memory includes a set of instructions; and
a processing unit connected to the bus system, wherein the processing unit executes the set of instructions to:
receive a file name associated with a library reference, wherein the library reference is included in an executable, and wherein the library reference indicates a particular library used for executing the executable;
receive environmental variable information in response to identifying an unavailable library in a secondary memory, wherein the unavailable library is associated with the file name;
access the compatible library from a shared library segment using the file name in response to receiving the environmental variable information, wherein the compatible library is associated with the file name; and
utilize the compatible library to execute the executable.

19. The data processing system of claim 18, wherein the unavailable library is an incompatible library, and wherein the incompatible library cannot be utilized to execute the executable.

20. The data processing system of claim 18, wherein the unavailable library indicates an inability to identify any library associated with the file name in the secondary memory.

* * * * *